United States Patent
Kawahara et al.

(10) Patent No.: US 9,681,379 B2
(45) Date of Patent: Jun. 13, 2017

(54) COMMUNICATION DEVICE FOR CONTROLLING COMMUNICATION THROUGH SECOND COMMUNICATION SYSTEM BASED ON FIELD INTENSITY OF RECEIVED INFORMATION OF COMMUNICATION THROUGH FIRST COMMUNICATION SYSTEM AND STORAGE MEDIUM

(71) Applicant: CASIO COMPUTER CO., LTD., Tokyo (JP)

(72) Inventors: Kazuma Kawahara, Akishima (JP); Toshihiko Yoshida, Fussa (JP); Yoichi Murayama, Fussa (JP); Gou Kawakami, Fussa (JP); Asami Aso, Kokubunji (JP); Takashi Kawashimo, Fussa (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 0 days.

(21) Appl. No.: 15/014,208

(22) Filed: Feb. 3, 2016

(65) Prior Publication Data
US 2016/0278012 A1    Sep. 22, 2016

(30) Foreign Application Priority Data
Mar. 20, 2015  (JP) .................................. 2015-057369

(51) Int. Cl.
*H04W 4/02*    (2009.01)
*H04W 52/02*   (2009.01)
*H04W 4/00*    (2009.01)

(52) U.S. Cl.
CPC ....... *H04W 52/0225* (2013.01); *H04W 4/008* (2013.01); *H04W 52/0245* (2013.01)

(58) Field of Classification Search
CPC ......... H04B 17/318; H04B 5/00; H04W 4/02; H04W 84/18; H04W 84/12; H04W 4/008; H04W 4/04; H04W 24/08; H04W 4/023; H04W 88/08; H04W 4/021; H04W 4/043; H04W 52/50; H04W 8/005; H04W 4/003; H04W 4/006; H04W 52/02; H04W 52/242; H04W 52/245
(Continued)

(56) References Cited

U.S. PATENT DOCUMENTS

2015/0334676 A1* 11/2015 Hart et al. ............ H04W 64/00
                                                              455/456.1
2015/0348146 A1* 12/2015 Shanmugam
                                 et al. .................. G06Q 30/0603
                                                              705/71
(Continued)

FOREIGN PATENT DOCUMENTS

JP    2012-098730 A    5/2012

*Primary Examiner* — Philip Sobutka
(74) *Attorney, Agent, or Firm* — Scully, Scott, Murphy & Presser, P.C.

(57) ABSTRACT

A communication device includes a reception unit, a detection unit and a control unit. The reception unit receives broadcast information broadcasted through first communication of a first communication system. The detection unit detects a radio field intensity of the received broadcast information. The control unit controls second communication of a second communication system based on the detected radio field intensity, thereby activating or deactivating the second communication.

6 Claims, 3 Drawing Sheets

(58) Field of Classification Search
USPC .................... 455/456.1, 456.2, 522; 370/328
See application file for complete search history.

(56) References Cited

U.S. PATENT DOCUMENTS

| | | | |
|---|---|---|---|
| 2016/0044442 A1* | 2/2016 | Pacelli et al. .......... | G06Q 20/18 455/41.1 |
| 2016/0094946 A1* | 3/2016 | Keithley ............... | H04W 4/023 455/456.3 |
| 2016/0142856 A1* | 5/2016 | Worrall et al. ....... | H04W 4/003 455/456.3 |

* cited by examiner

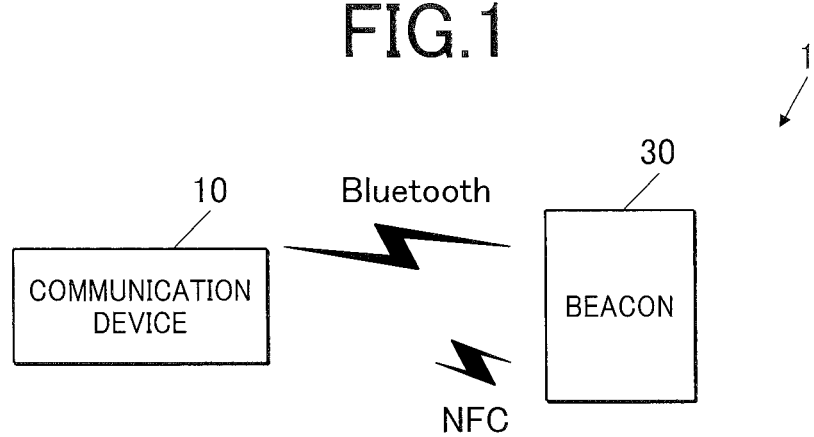
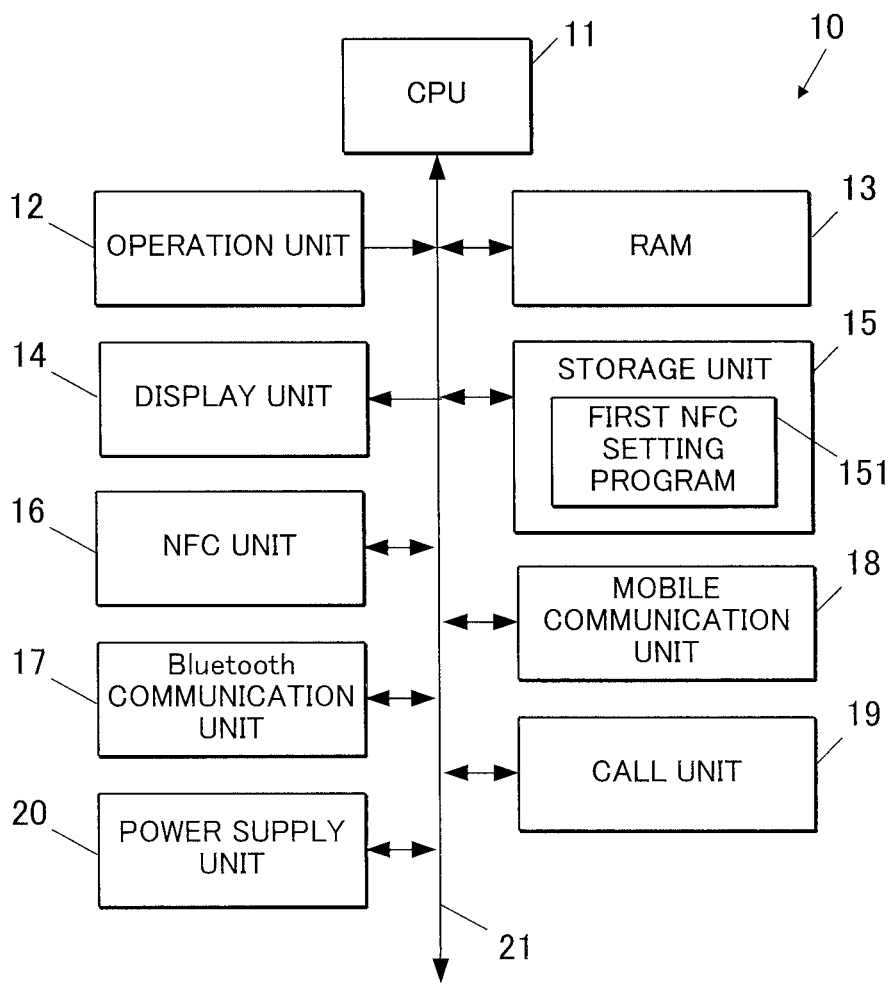

COMMUNICATION DEVICE FOR CONTROLLING COMMUNICATION THROUGH SECOND COMMUNICATION SYSTEM BASED ON FIELD INTENSITY OF RECEIVED INFORMATION OF COMMUNICATION THROUGH FIRST COMMUNICATION SYSTEM AND STORAGE MEDIUM

CROSS-REFERENCE TO RELATED APPLICATIONS

This application is based upon and claims the benefit of priority under 35 USC 119 of Japanese Patent Application No. 2015-057369 filed on Mar. 20, 2015, the entire disclosure of which, including the description, claims, drawings and abstract, is incorporated herein by reference in its entirety.

BACKGROUND OF THE INVENTION

1. Field of the Invention

The present invention relates to a communication device and a storage medium.

2. Description of the Related Art

There has been known a display device which is placed at a public space or the like and displays advertisements.

As the display device, according to, for example, Japanese Patent Application Publication No. 2012-98730, there is known a digital information display device having an RFID (Radio Frequency IDentification) module. The digital information display device provides through near field wireless communication of RFID a user card with benefits which are gained by access to advertisements when a consumer brings the user card closer thereto to be recognized.

As a portable device which performs near field wireless communication, there are an IC card as the above-described user card and a communication device having a near field wireless communication function, such as a smartphone. However, in order to use the communication device to the above-described conventional digital information display device, the near field wireless communication of the communication device needs to be always active.

SUMMARY OF THE INVENTION

Objects of the present invention include preventing communication of a predetermined communication system from always being active.

According to an aspect of the present invention, there is provided a communication device including: a reception unit which receives broadcast information broadcasted through first communication of a first communication system; a detection unit which detects a radio field intensity of the received broadcast information; and a control unit which controls second communication of a second communication system based on the detected radio field intensity, thereby activating or deactivating the second communication.

BRIEF DESCRIPTION OF THE DRAWING

The present invention is fully understood from the detailed description given hereinafter and the accompanying drawings, which are given by way of illustration only and thus are not intended to limit the present invention, wherein:

FIG. 1 is a block diagram showing a wireless communication system according to embodiments of the present invention;

FIG. 2 is a block diagram showing the functional configuration of a communication device;

DETAILED DESCRIPTION OF THE PREFERRED EMBODIMENTS

Figure 3:
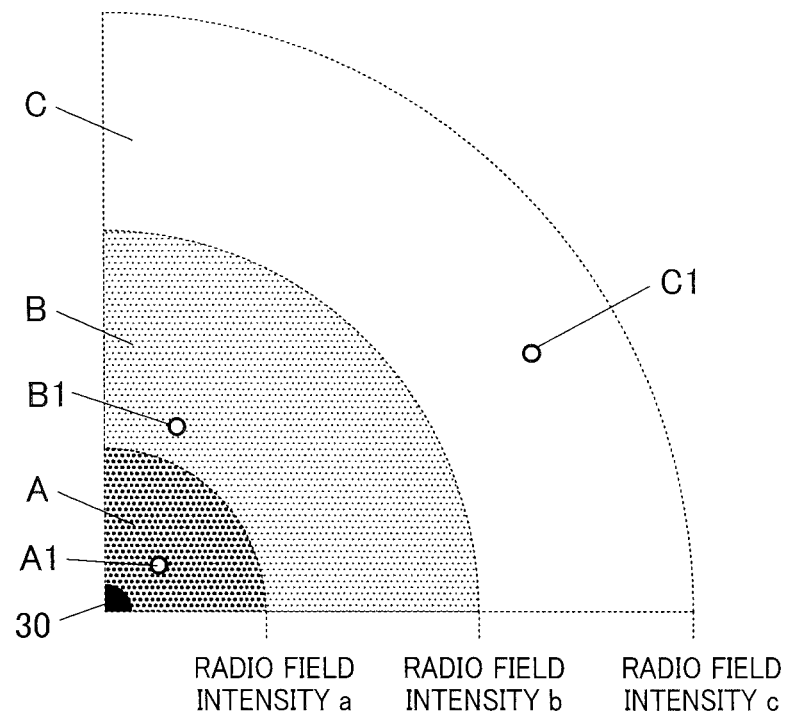
FIG. 3 shows first, second and third regions according to the radio field intensity of Bluetooth communication of a beacon.

Hereinafter, first to third embodiments of the present invention are detailed with reference to the drawings. The present invention is not limited to the illustrated examples.

First Embodiment

A first embodiment of the present invention is described with reference to FIG. 1 to FIG. 4. First, the configuration of a device(s) according to the first embodiment is described with reference to FIG. 1 and FIG. 2. FIG. 1 is a block diagram showing a wireless communication system 1 of the first embodiment. FIG. 2 is a block diagram showing the functional configuration of a communication device 10 thereof.

As shown in FIG. 1, the wireless communication system 1 of the first embodiment includes a communication device 10 and a beacon 30. The beacon 30 is a communication device which is placed, for example, in a public transportation system such as a train or a bus, at a public space such as a station or a shopping mall or in a store, and distributes advertising information. The beacon 30 performs communication of at least two wireless communication systems. In the first embodiment, the beacon 30 performs wireless communication of a Bluetooth® LE (Low Energy) communication system and wireless communication of an NFC (Near Field Communication) system. However, communication systems of the beacon 30 are not limited thereto.

Bluetooth is a wireless communication standard to perform wireless communication through transmission/reception of radio waves and uses a frequency band of 2.4 GHz, and its communication distance is 2.5 m to 50 m. NFC is a wireless communication standard to perform wireless communication through an electromagnetic field and uses a frequency band of 13.56 MHz, and its communication distance is about several cm to 1 m.

The communication device 10 is a communication device which performs communication of at least two wireless communication systems, as with the beacon 30. In the first embodiment, the communication device 10 has a Bluetooth communication function and an NFC function. Further, in the first embodiment, the communication device 10 is a smartphone which a user as a recipient of the advertising information has, but not limited thereto. The communication device 10 may be another type of communication device such as a tablet PC (Personal Computer), a mobile phone or a PDA (Personal Digital Assistant).

The beacon 30 broadcasts beacon information containing its identification information through Bluetooth communication. In addition, the beacon 30 sends offering information such as coupon information to the communication device 10 through NFC for the user who has the communication device 10 and is around the beacon 30.

The communication device 10 receives the beacon information from the beacon 30 through Bluetooth communication. In addition, the communication device 10 activates NFC (NFC function) according to the radio field intensity of the received beacon information so as to establish communication with the beacon 30 and receive the offering information from the beacon 30 through NFC.

Next, the functional configuration of the communication device 10 is described with reference to FIG. 2. As shown in FIG. 2, the communication device 10 includes a CPU (Central Processing Unit) 11 as a control unit, an operation unit 12, a RAM (Random Access Memory) 13, a display unit 14, a storage unit 15, an NFC unit 16, a Bluetooth communication unit 17 as a reception unit and a detection unit, a mobile communication unit 18, a call unit 19 and a power supply unit 20. The units of the communication device 10 are connected to each other via a bus 21.

The CPU 11 controls the units of the communication device 10. The CPU 11 reads programs specified from among a system program and application programs stored in the storage unit 15, opens the specified programs on the RAM 13 and performs various types of processing by working together with the programs.

The operation unit 12 includes a touch panel and buttons. The operation unit 12 accepts key input and locator input and also accepts user touch input and button press input, and outputs operation information about them to the CPU 11. The RAM 13 is a volatile semiconductor memory and forms a work area where various data and programs are temporarily stored.

The display unit 14 is constituted of an LCD (Liquid Crystal Display), an EL (ElectroLuminescent) display or the like, and performs various types of display according to display information instructed by the CPU 11. On the display screen of the display unit 14, the touch panel of the operation unit 12 is disposed.

The storage unit 15 is an information readable/writable semiconductor memory which is constituted of a flash memory, an EEPROM (Electrically Erasable Programmable ROM) or the like. The storage unit 15 stores therein a first NFC setting program 151 and a first application program, which are described below.

The NFC unit 16 includes, for NFC, an antenna, a modulation-demodulation circuit and a signal processing circuit, and performs wireless communication of an NFC system with an external device, following an instruction(s) from the CPU 11. The NFC unit 16 is turned on or off in accordance with an instruction(s), from the CPU 11, to activate or deactivate NFC. When the NFC unit 16 is turned on, electric power is supplied to the NFC unit 16 to perform NFC, whereby NFC becomes available. On the other hand, when the NFC unit 16 is turned off, NFC becomes unavailable, and accordingly electric power consumption is reduced.

The Bluetooth communication unit 17 includes, for Bluetooth communication, an antenna, a modulation-demodulation circuit and a signal processing circuit, and performs wireless communication of a Bluetooth communication system with an external device, following an instruction(s) from the CPU 11. The Bluetooth communication unit 17 has a function by which the radio field intensity of the received radio waves of Bluetooth communication is detected and detection information about that is output to the CPU 11.

The mobile communication unit 18 includes, for mobile communication (mobile phone communication) of W-CDMA (Wideband Code Division Multiple Access), LTE (Long Term Evolution) or the like, an antenna, a modulation-demodulation circuit and a signal processing circuit, and performs wireless communication of a mobile communication system with an external device such as a base station, following an instruction(s) from the CPU 11.

The call unit 19 includes a microphone, an amplifier and a speaker, and accepts input of user's voice (sound) with the microphone and outputs the user's voice and voice of the person on the other end of the line with the amplifier and the speaker, following an instruction(s) from the CPU 11. The power supply unit 20 is a power supply unit constituted of a primary cell or a secondary cell to supply electric power to the units in the communication device 10.

The configuration of the communication device 10 is not limited to the above and may include other components; for example, an imaging unit, a GPS (Global Positioning System) and a communication unit such as a wireless LAN (Local Area Network) communication unit.

Figure 4:
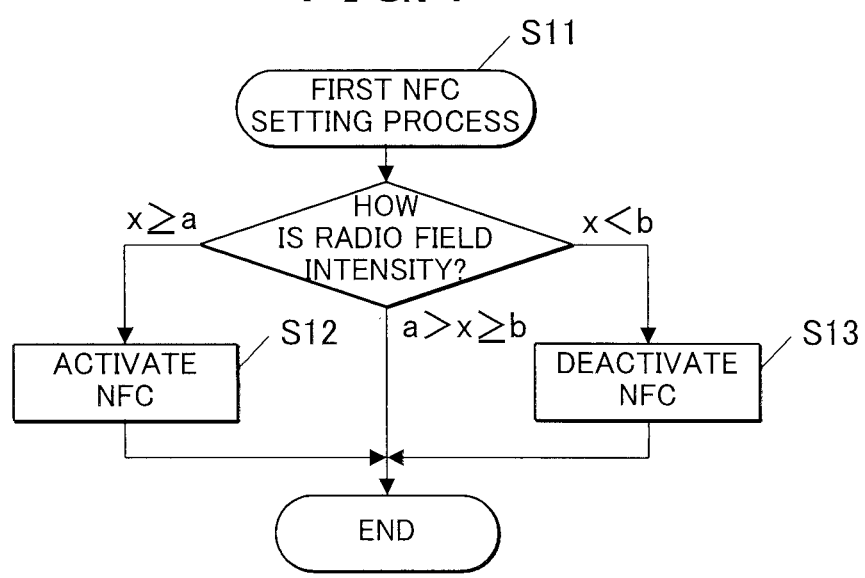
FIG. 4 shows a flowchart of a first NFC setting process.

Next, action of the wireless communication system 1 is described with reference to FIG. 3 and FIG. 4. FIG. 3 shows regions A, B and C according to the radio field intensity of Bluetooth communication of the beacon 30. FIG. 4 shows a flowchart of a first NFC setting process.

First, the regions A, B and C according to the radio field intensity of Bluetooth communication of the beacon 30 are described with reference to FIG. 3. As shown in FIG. 3, the regions A, B and C are set concentrically with the beacon 30 centered. NFC has a short communication distance. The region A is a region which is near the beacon 30, where there is a possibility that NFC is performed with the beacon 30 and where NFC of the communication device 10 is automatically activated. The region B is a region where the communication device 10 is approaching the beacon 30 or going away from the beacon 30 and where NFC setting of the communication device 10 is deferred. The region C is a region which is far from the beacon 30, where there is no possibility that NFC is performed with the beacon 30 and where NFC of the communication device 10 is automatically deactivated.

The radio field intensity of radio waves of Bluetooth communication from the beacon 30 at the border between the regions A and B is referred to as a radio field intensity a. The radio field intensity of radio waves of Bluetooth communication from the beacon 30 at the border between the regions B and C is referred to as a radio field intensity b. The radio field intensity of radio waves of Bluetooth communication from the beacon 30 at the farthest point in the region C from the beacon 30 is referred to as a radio field intensity c.

The radio field intensity of radio waves of the beacon information broadcasted from the beacon 30 is smaller as the distance from the beacon 30 is longer. Therefore, the radio field intensities a, b and c have a relationship of "a>b>c".

Next, the first NFC setting process performed by the communication device 10 is described with reference to FIG. 4. First, the CPU 11 executes the first application program. The first application program has a function by which coupon information provided by the beacon 30 can be obtained through NFC with the NFC unit 16 while NFC is active, for example.

The first NFC setting process is a process to activate or deactivate NFC according to the radio field intensity of Bluetooth communication and is repeatedly performed at predetermined time intervals while the first application program is in operation. In the communication device 10, as described above, the first application program is started in advance by user operation on the operation unit 12.

In the communication device 10, the CPU 11 performs the first NFC setting process by working together with the first NFC setting program 151 read from the storage unit 15 and appropriately opened on the RAM 13, by being triggered by arrival of performance timing of the above-described predetermined time intervals.

First, the CPU 11 obtains the detected radio field intensity x of Bluetooth communication from the Bluetooth communication unit 17 and determines whether the radio field intensity x is (i) at least the radio field intensity a (i.e. x≥a), (ii) less than the radio field intensity b (i.e. x<b), or (iii) at least the radio field intensity b but less than the radio intensity field a (i.e. a>x≥b) (Step S11). When determines that the radio field intensity x is at least the radio field intensity b but less than the radio intensity field a (Step S11; a>x≥b), the CPU 11 ends the first NFC setting process.

When determines that the radio field intensity x is at least the radio field intensity a (Step S11; x≥a), the CPU 11 turns on the NFC unit 16, thereby activating NFC (Step S12) and ends the first NFC setting process. When determines that the radio field intensity x is less than the radio field intensity b (Step S11; x<b), the CPU 11 turns off the NFC unit 16, thereby deactivating NFC (Step S13) and ends the first NFC setting process.

For example, by the first NFC setting process, when a user having the communication device 10 is at a point C1 in the region C shown in FIG. 3, NFC (of the communication device 10) is deactivated (or inactive), and while the user proceeds to a point B1 in the region B, NFC setting is deferred and remains inactive. When the user enters the region A, NFC is activated, and the communication device 10 receives, owing to the first application program, coupon information at a point A1, where the communication device 10 is in the immediate vicinity of the beacon 30, in the region A from the beacon 30 through NFC, and while the user proceeds to the point B1 in the region B, NFC setting is deferred and remains active. When the user enters the region C, NFC is deactivated.

As described above, according to the first embodiment, the communication device 10 includes: the Bluetooth communication unit 17 which receives the beacon information from the beacon 30 as broadcast information broadcasted through Bluetooth communication and detects the radio field intensity of the received beacon information; and the CPU 11 which controls NFC on the basis of the detected radio field intensity, thereby activating or deactivating NFC. This can prevent NFC of a predetermined NFC system from being always active and prevent the NFC unit 16 for NFC from being always active, and therefore can reduce electric power consumption.

Further, the CPU 11 activates NFC when the detected radio field intensity x is at least the radio field intensity a, which is a first threshold value, and deactivates NFC when the detected radio field intensity x is less than the radio field intensity b, which is a second threshold value smaller than the radio field intensity a. This can surely make NFC active in the region A, where x≥a holds and which is near the beacon 30, and surely make NFC inactive in the region C, where x<b holds and which is far from the beacon 30, and also can defer NFC setting in the region B, where a>x≥b holds, and therefore can prevent NFC from frequently switching between being active and inactive even when a user having the communication device 10 crosses the border (s) between such regions (e.g. the border between the regions A and B and/or the border between the regions B and C), for example.

Second Embodiment

Figure 5:
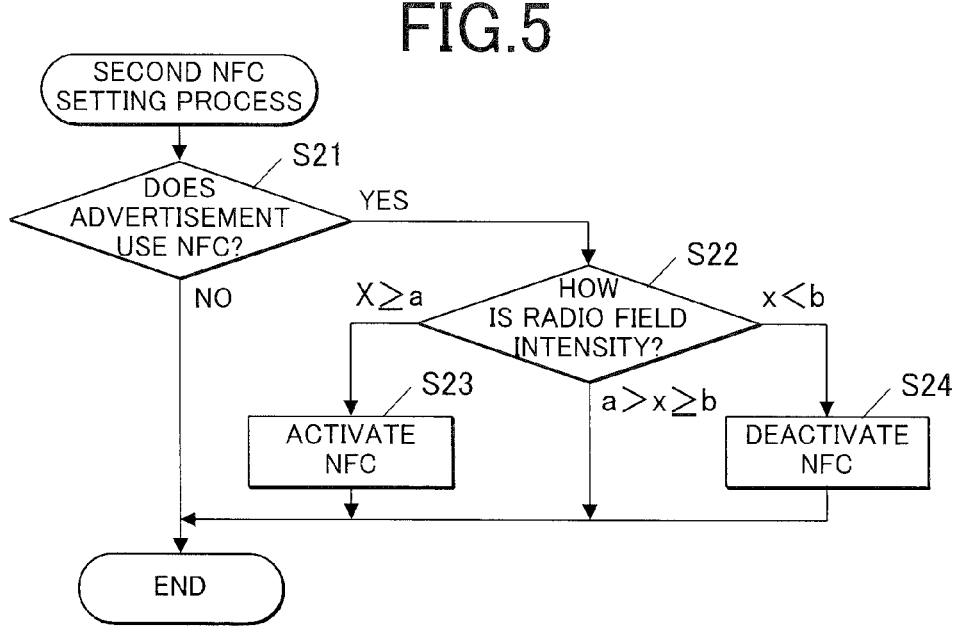
FIG. 5 shows a flowchart of a second NFC setting process.

A second embodiment of the present invention is described with reference to FIG. 5. FIG. 5 shows a flowchart of a second NFC setting process.

In the second embodiment, the wireless communication system 1 is used as with the first embodiment. However, in the storage unit 15 of the communication device 10, a second NFC setting program and a second application program are stored instead of the first NFC setting program 151 and the first application program.

Action of the wireless communication system 1 is described with reference to FIG. 5. The second application program has a function by which when the beacon information is received from the beacon 30, advertising information related to the beacon identification information contained in the beacon information is requested and received from a server (not shown) through mobile communication with the mobile communication unit 18 and displayed on the display unit 14, and coupon information, corresponding to the viewed advertising information, provided by the beacon 30 having the beacon identification information can be obtained through NFC with the NFC unit 16 while NFC is active, for example.

The beacon information contains, in addition to the beacon identification information, flag information indicating whether or not the advertising information uses NFC.

The second NFC setting process is a process to activate or deactivate NFC according to (i) the flag information, which is contained in the beacon information, and (ii) the radio field intensity of Bluetooth communication and is repeatedly performed at predetermined time intervals while the second application program is in operation. In the communication device 10, the second application program is started in advance by user operation on the operation unit 12.

In the communication device 10, the CPU 11 performs the second NFC setting process by working together with the second NFC setting program read from the storage unit 15 and appropriately opened on the RAM 13, by being triggered by arrival of performance timing of the above-described predetermined time intervals.

As shown in FIG. 5, first, the CPU 11 receives the beacon information from the beacon 30 via the Bluetooth communication unit 17, refers to the flag information contained in the received beacon information, and determines whether or not the advertising information uses NFC (Step S21). When determines that the advertising information does not use NFC (Step S21; NO), the CPU 11 ends the second NFC setting process. On the other hand, when determines that the advertising information uses NFC (Step S21; YES), the CPU 11 performs Step S22. Steps S22 to S24 are the same as Steps S11 to S14 in FIG. 4, respectively. When NFC is activated (thereby being active) and the communication device 10 is in the immediate vicinity of the beacon 30, the communication device 10 receives, owing to the second application program, coupon information corresponding to the advertising information from the beacon 30 through NFC.

As described above, according to the second embodiment, the CPU 11 determines whether or not the advertising information, which is related to the received beacon information, uses NFC, and when determines that the advertising information uses NFC, controls NFC on the basis of the detected radio field intensity, thereby activating or deactivating NFC. This can prevent NFC from unnecessarily being activated when the advertising information which does not use NFC is received.

Third Embodiment

Figure 6:
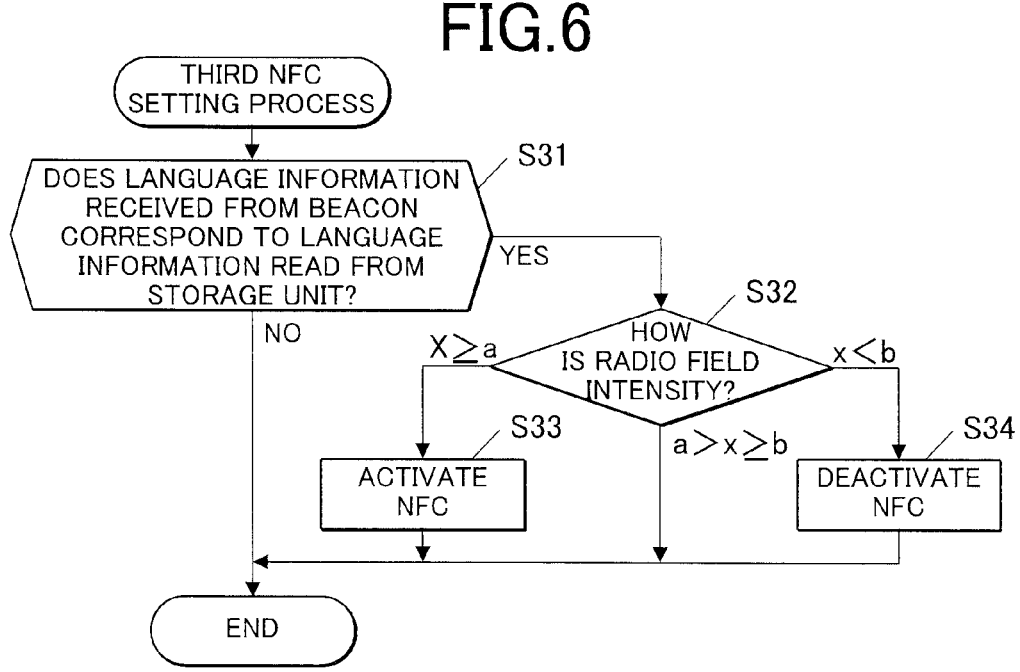
FIG. 6 shows a flowchart of a third NFC setting process.

A third embodiment of the present invention is described with reference to FIG. 6. FIG. 6 shows a flowchart of a third NFC setting process.

In the third embodiment, the wireless communication system 1 is used as with the first embodiment. However, in the storage unit 15 of the communication device 10, a third NFC setting program and a third application program are stored instead of the first NFC setting program 151 and the first application program.

Action of the wireless communication system 1 is described with reference to FIG. 5. The third application program has a function by which when the beacon information is received from the beacon 30, advertising information in a predetermined language related to the beacon identification information contained in the beacon information is requested and received from a server (not shown) through mobile communication with the mobile communication unit 18 and displayed on the display unit 14, and coupon information, corresponding to the viewed advertising information, provided by the beacon 30 having the beacon identification information can be obtained through NFC with the NFC unit 16 while NFC is active, for example.

The beacon information contains, in addition to the beacon identification information, language information indicating in what language the advertising information is available. Further, in the storage unit 15 of the communication device 10, language information indicating a language(s) supported by the communication device 10 is set and stored.

The third NFC setting process is a process to activate or deactivate NFC according to (i) a specific condition and (ii) the radio field intensity of Bluetooth communication and is repeatedly performed at predetermined time intervals while the third application program is in operation. In the communication device 10, the third application program is started in advance by user operation on the operation unit 12.

In the communication device 10, the CPU 11 performs the third NFC setting process by working together with the third NFC setting program read from the storage unit 15 and appropriately opened on the RAM 13, by being triggered by arrival of performance timing of the above-described predetermined time intervals.

As shown in FIG. 6, first, the CPU 11 reads the language information from the storage unit 15, receives the beacon information from the beacon 30 via the Bluetooth communication unit 17, and determines whether or not the language information contained in the received beacon information corresponds to the read language information (Step S31). When determines that the language information contained in the received beacon information does not correspond to the read language information (Step S31; NO), the CPU 11 ends the third NFC setting process. On the other hand, when determines that the language information contained in the received beacon information corresponds to the read language information (Step S31; YES), the CPU 11 performs Step S32. Steps S32 to S34 are the same as Steps S11 to S13 in FIG. 4, respectively. When NFC is activated (thereby being active) and the communication device 10 is in the immediate vicinity of the beacon 30, the communication device 10 receives, owing to the third application program, coupon information corresponding to the advertising information from the beacon 30 through NFC.

As described above, according to the third embodiment, the CPU 11 determines whether or not the communication device 10 satisfies a specific condition, and when determines that the communication device 10 satisfies the specific condition, controls NFC on the basis of the detected radio field intensity, thereby activating or deactivating NFC. The specific condition is a condition that a specific language is supported. When the communication device 10 supports the specific language, the CPU 11 controls NFC on the basis of the detected radio field intensity, thereby activating or deactivating NFC. This can prevent NFC from unnecessarily being activated when the language information received from the beacon 30 does not correspond to the language information read from the storage unit 15, which is a condition of no use of NFC.

In the above, as a computer readable medium of the programs of the present invention, a flash memory or the like of the storage unit 15 is used. However, the present invention is not limited thereto. As another computer readable medium, a ROM or a portable storage medium such as a CD-ROM can be used. Further, as a medium to provide data of the programs of the present invention through a communication line, a carrier wave can be used.

The descriptions in the above embodiments are examples of the communication device and the storage medium of the present invention, and hence the present invention is not limited thereto.

For example, in the above embodiments, NFC is automatically activated or deactivated without information displayed. However, this is not a limitation. The CPU 11 may display, on the display unit 14, display information such as popup information indicating that NFC is activated or deactivated when the CPU 11 activates or deactivates NFC.

Further, in the second and third embodiments, the advertising information is requested and received from a server through mobile communication, but not limited thereto. For example, the advertising information may be requested and received from a server through communication of another communication system such as Wi-Fi, or may be requested and received from the beacon 30 or a server connected to the beacon 30 through Bluetooth communication or NFC. Further, it is possible that the communication device 10 stores in advance in the storage unit 15 advertising information related to each of beacons 30, and when receives beacon information from a beacon 30 among the beacons 30, reads and obtains from the storage unit 15 advertising information related to the beacon identification information contained in the received beacon information.

Further, in the third embodiment, the CPU 11 determines whether or not the communication device 10 satisfies a specific condition by determining whether or not the language information of the communication device 10 corresponds to the language information on the advertising information. However, this is not a limitation. For example, it is possible that the CPU 11 determines whether or not the communication device 10 satisfies a specific condition by determining whether or not a user of the communication device 10 is registered as a member of service (discounts, free gifts, etc. included) related to the beacon identification information contained in the beacon information received from the beacon 30, and when determines that the user is registered as a member of the service, determines the radio field intensity. In this case, only the communication device 10 owned by a member thereof can receive coupon information or the like from the beacon 30 through NFC. The member registration information on the service, which is related to the beacon identification information, used for determining whether or not the user is registered as a member of the service is stored, for example, in the storage unit 15 or on a server communicable through mobile communication or the like, and therefore the communication device 10 can obtain the information.

It is also possible that the CPU 11 determines whether or not the communication device 10 satisfies a specific condition by determining whether or not a user of the communication device 10 has accumulated points for the service, which is related to the beacon information received from the beacon 30, to a predetermined number of points or more, and when determines that the user has the predetermined number of points or more, determines the radio field intensity. In this case, only the communication device 10 owned by a user who has the predetermined number of points or more can receive coupon information or the like which is exchanged with the predetermined number of points from the beacon 30 through NFC. The point information used for determining whether or not the user has accumulated points for the service to the predetermined number of points or more is stored, for example, in the storage unit 15 or on a server communicable through mobile communication, and therefore the communication device 10 can obtain the information.

It is also possible that the CPU 11 determines whether or not the communication device 10 satisfies a specific condition by determining whether or not a specific application program related to the beacon information received from the beacon 30 is installed in the communication device 10, and when determines that the specific application program is installed in the communication device 10, determines the radio field intensity. In this case, the specific application program makes it possible to receive coupon information or the like from the beacon 30 through NFC. The installation information used for determining whether or not the specific application program is installed is stored, for example, in the storage unit 15.

In the above embodiments, the beacon 30 has the Bluetooth communication function and the NFC function. However, this is not a limitation. For example, it is possible that the beacon 30 has the Bluetooth communication function, and separately from the beacon 30, an NFC device having the NFC function is provided. Further, the beacon 30 and the NFC device may be disposed at different places. For example, when the NFC device is disposed at a point in the region A shown in FIG. 3 and the communication device 10 is in the region A, there is a possibility that NFC is performed with the NFC device.

Needless to say, the detailed configurations and actions of the components of the wireless communication system 1 of the embodiments can be appropriately modified within the scope not departing from the spirit of the present invention.

In the above, several embodiments of the present invention are described. However, the scope of the present invention is not limited to the above embodiments but includes the scope of the present invention stated in claims below and the scope of equivalents.

What is claimed is:

1. A communication device comprising:
a reception unit configured to receive broadcast information broadcasted through first communication of a first communication system;
a detection unit configured to detect a radio field intensity of the received broadcast information; and
a control unit configured to control second communication of a second communication system based on the detected radio field intensity, thereby activating or deactivating the second communication,
wherein the control unit is configured to activate the second communication when the detected radio field intensity is at least a first threshold value, and to deactivate the second communication when the detected radio field intensity is less than a second threshold value which is smaller than the first threshold value.

2. The communication device according to claim 1, wherein the control unit is configured to determine whether or not information related to the received broadcast information uses the second communication, and when the control unit determines that the information uses the second communication, the control unit is configured to control the second communication based on the detected radio field intensity, thereby activating or deactivating the second communication.

3. The communication device according to claim 1, wherein the control unit is configured to determine whether or not the communication device satisfies a specific condition, and when the control unit determines that the communication device satisfies the specific condition, the control unit is configured to control the second communication based on the detected radio field intensity, thereby activating or deactivating the second communication.

4. The communication device according to claim 3, wherein the specific condition is that a specific language is supported, and when the control unit determines that the communication device supports the specific language, the control unit is configured to control the second communication based on the detected radio field intensity, thereby activating or deactivating the second communication.

5. The communication device according to claim 1,
wherein the reception unit comprises:
an antenna;
a modulation-demodulation circuit; and
a signal processing circuit,
wherein the reception unit is configured to perform a first wireless communication within a first range as the first communication of the first communication system, and
wherein the control unit is configured to control a second wireless communication within a second range as the second communication of the second communication system, wherein a maximum distance of the first range is greater than a maximum range of the second range.

6. A non-transitory storage medium storing a program to make a computer:
control a reception unit to receive broadcast information broadcasted through first communication of a first communication system;
control a detection unit to detect a radio field intensity of the received broadcast information; and
control second communication of a second communication system based on the detected radio field intensity, thereby activating or deactivating the second communication,
wherein the the computer is configured to activate the second communication when the detected radio field intensity is at least a first threshold value, and to deactivate the second communication when the detected radio field intensity is less than a second threshold value which is smaller than the first threshold value.

\* \* \* \* \*

UNITED STATES PATENT AND TRADEMARK OFFICE
CERTIFICATE OF CORRECTION

PATENT NO. : 9,681,379 B2
APPLICATION NO. : 15/014208
DATED : June 13, 2017
INVENTOR(S) : Kazuma Kawahara et al.

It is certified that error appears in the above-identified patent and that said Letters Patent is hereby corrected as shown below:

On the Title Page

Item (54) should read: COMMUNICATION DEVICE FOR CONTROLLING COMMUNICATION THROUGH SECOND COMMUNICATION SYSTEM BASED ON FIELD INTENSITY OF RECEIVED INFORMATION OF COMMUNICATION THROUGH FIRST COMMUNICATION SYSTEM, AND STORAGE MEDIUM Signed and Sealed this
Third Day of October, 2017

Joseph Matal
*Performing the Functions and Duties of the*
*Under Secretary of Commerce for Intellectual Property and*
*Director of the United States Patent and Trademark Office*